United States Patent [19]

Tsuji

[11] Patent Number: 5,727,224
[45] Date of Patent: Mar. 10, 1998

[54] DOCUMENT IMAGE PROCESSOR FOR INSERTING AND EDITING BRACKET SYMBOLS AND ASSOCIATED TEXT

[75] Inventor: Masayuki Tsuji, Yamatokooriyama, Japan

[73] Assignee: Sharp Kabushiki Kaisha, Osaka, Japan

[21] Appl. No.: 611,708

[22] Filed: Mar. 6, 1996

[30] Foreign Application Priority Data

Apr. 7, 1995 [JP] Japan .................. 7-082425

[51] Int. Cl.$^6$ .................................. G06F 17/00
[52] U.S. Cl. .................. 395/792; 395/782
[58] Field of Search .................. 395/765, 782, 395/783, 792, 793, 801, 804, 326, 339, 141; 382/173, 177, 190; 345/121, 127, 141, 157

[56] References Cited

U.S. PATENT DOCUMENTS

| | | | |
|---|---|---|---|
| 5,347,295 | 9/1994 | Agulnick et al. | 345/156 |
| 5,471,578 | 11/1995 | Moran et al. | 395/358 |
| 5,481,278 | 1/1996 | Shigematsu et al. | 345/179 |
| 5,555,357 | 9/1996 | Fernandes et al. | 395/141 |
| 5,574,842 | 11/1996 | Takakura et al. | 395/805 |
| 5,590,219 | 12/1996 | Gourdol | 382/202 |
| 5,613,019 | 3/1997 | Altman et al. | 382/311 |

FOREIGN PATENT DOCUMENTS

| | | |
|---|---|---|
| 64-74667 | 3/1989 | Japan. |
| 2-297125 | 12/1990 | Japan. |
| 5-2581 | 1/1993 | Japan. |
| 5-216877 | 8/1993 | Japan. |

OTHER PUBLICATIONS

Kvern, Real World Freehand 3, Peachpit Press, Inc., 1991, pp. 181–186.

*Primary Examiner*—Heather R. Herndon
*Assistant Examiner*—Stephen Hong
*Attorney, Agent, or Firm*—Nixon & Vanderhye P.C.

[57] ABSTRACT

A computer text and symbol editor, such as a word processing software program, has a bracket editing software tool to insert and revise bracket symbols. The document information processing device includes an input means for inputting document text information and symbolic information including bracket symbols that extend over a plurality of horizontal or vertical lines of screen text. The input device has a corresponding input position indicating means for indicating an input position in the document information; and a symbol-inputting-position determining means for determining a position of inputting the bracket symbol. The device may include a bracket symbol length discriminating means for judging the symbol length, and a retrieving means for retrieving the bracket symbol information in a document storage means from the position specified by the input position indicating means.

10 Claims, 18 Drawing Sheets

FIG.10

| BLANK CHARACTER | BLANK CODE | LINE-FEED CODE | INPUT-FREE CODE |
|---|---|---|---|
| SKETCH | □ | ↓ | · |
|  | /69 | /70 | /71 |

FIG.12

| FEATURE POINT POSITION | 0 | 1 | 2 | 3 | 4 | 5 |
|---|---|---|---|---|---|---|
| SKETCH | [ | { | { | { | { | [ |

FIG.13

| TYPE NUMBER | 1 | 2 | 3 | 4 | 5 | 6 | 7 | 8 |
|---|---|---|---|---|---|---|---|---|
| BRACKET FOR GROUPING A PLURALITY OF CHARACTER LINES | ⌠⌡ | 〈 | { | ( | [ | [ | 〔 | 《 |
| FEATURE POINT | EXIST | EXIST | EXIST | NIL | NIL | NIL | NIL | NIL |

FIG.14

| DIRECTION FLAG | 1 | 2 | 3 | 4 |
|---|---|---|---|---|
| BRACKET FOR GROUPING A PLURALITY OF CHARACTER LINES | { | } | ⌣ | ⌢ |

DOCUMENT IMAGE PROCESSOR FOR INSERTING AND EDITING BRACKET SYMBOLS AND ASSOCIATED TEXT

BACKGROUND OF THE INVENTION

The present invention relates to a document information processing device, such as Japanese word processors, microcomputers and so on, which is capable of inputting characters, graphics and symbols, and more particularly to a document information processing device being capable of editing characters, graphics and symbols each extending over a plurality of horizontal or vertical lines.

A conventional document information processing device such as a conventional Japanese word processor has, in addition to basic functions of inputting characters and editing texts, functions of generating and displaying brackets for grouping a plurality of horizontal or vertical lines of characters, and is capable of editing a text put in brackets or enclosed between two vertical strings of characters. Such a system has been also developed that holds position codes in a text to specify a position for displaying graphics and symbols in the text.

Japanese Laid-open Patent Publication No. 64-74667 describes a document processing device which is capable of selecting a character consisting of plural combined characters (such as Japanese Kanji being ideograms) from a group of previously prepared variations for the purpose of effecting easier character inputting operation.

Japanese Laid-open Patent Publication No. 2-297125 describes an information processing device which is capable of generating, by magnifying a selected bracket pattern, a bracket or brackets optimally suited to be placed together with text in a designated area and then automatically outputting the generated bracket.

Japanese Laid-open Patent Publication No. 5-2581 describes a character inputting device which is capable of presetting specified characters to be paired with each other, determining the number of character lines placed between the paired specified characters and generating a pair of brackets having a suitable size.

Japanese Laid-open Patent Publication No. 5-216877 describes a document processing device which is capable of easily designating a position of placing graphics in text by using a position code of graphics.

With the above-mentioned conventional document processing devices, dividing an extending bracket enclosing therein plural lines of characters requires a user to previously change sizes of the brackets to be used, delete the existing bracket and enter a new bracket, specify an area for entering a next bracket after dividing the old bracket, move a cursor to an input position and enter a next bracket and so on.

In case of synthesizing two existing brackets each grouping plural lines of characters to form one bracket covering two groups of plural lines, it is needed to delete the proceeding bracket and then elongate the preceding bracket to cover all lines or to delete two brackets to be synthesized and then enter a new bracket having a suitably increased length.

In case of elongating an existing bracket grouping a plurality of character lines and rearranging the lines to be evenly spaced therebetween within the length of the bracket, it is required first to elongate the bracket or delete the existing bracket and enter a new bracket of a suitable length and then to insert a single line-feed or half-line-feed code between the character lines grouped by the elongated bracket.

In case of synthesizing or elongating a bracket extending over a boundary between two differently formatted areas, it is necessary to finally unify a format of the area covered by the bracket synthesized or elongated by the above-mentioned procedure.

In case of designating an area covered by a bracket, it is required to replace a cursor to specify a starting point and an ending point of the area.

In case of necessarily dividing a bracket, synthesizing a bracket from two or more brackets, widening a bracket to cover more wide area and specifying an area to be grouped by a bracket in an already entered document, one must perform complicated operations for deleting an existing bracket, adding a new bracket, specifying a starting point and a length of a bracket and so on.

SUMMARY OF THE INVENTION

It is an object of the present invention to provide a document information processing device which is capable of easily dividing a symbol or graphic symbol relating to a plurality of horizontal or vertical character lines by automatically changing and inserting symbol information when a position of dividing the symbol was specified by a cursor.

It is an another object of the present invention to provide a document information processing device which is capable of automatically retrieving the stored symbol information from a position designated by a cursor and of discriminating whether the designated position exists on the stored symbol position by recognizing the retrieved character position, kind of the character and symbol length to divide the symbol or graphic symbol extending over a plurality of horizontal or vertical character lines.

It is an another object of the present invention to provide a document information processing device which is capable of easily synthesizing a symbol or graphic symbol extending a plurality of horizontal or vertical character lines by automatically changing and deleting symbol information by designating a synthesizing position by a cursor.

It is an another object of the present invention to provide a document information processing device which is capable of easily designating a position of synthesizing a symbol or graphic symbol relating a plurality of horizontal or vertical lines of characters by automatically retrieving a stored document information from a position designated by a cursor, determining a kind of character of the retrieved symbol, a top position of character lines and the symbol length and retrieving a symbol to be synthesized.

It is an another object of the present invention to provide a document information processing device which is capable of easily editing a document with rearranging character lines grouped by a widened symbol or graphic symbol relating a plurality of horizontal or vertical lines of characters by automatically entering a single line-feed or half-line-feed code into each interlinear spacing or entering a blank character between characters or evenly allocating lines and characters.

It is an another object of the present invention to provide a document information processing device which is capable of easily editing a document by automatically unifying a format of an area covered by a symbol in case of inserting, synthesizing and elongating the symbol or graphic symbol which relates to a plurality of horizontal or vertical character lines and extends over a boundary between two differently formatted areas.

It is an another object of the present invention to provide a document information processing device which is capable of recognizing a specified area to be enclosed in brackets or graphic symbols extending over a plurality of horizontal or vertical character lines when only one point of the symbol is indicated by a cursor, thereby making it easier to designate a bracketed area.

It is an another object of the present invention to provide a document information processing device which is capable of recognizing an area of lines to be grouped by a bracket or graphic symbol extending over a plurality of horizontal or vertical character lines when only one point of the bracket or the graphic symbol is indicated by a cursor, thereby making it easier to designate an area containing lines specified by the bracket.

(1) In the present invention, a document information processing device has facilities to specify a position of dividing a symbol extending over a plurality of horizontal or vertical character lines by an input position indicating means, divide the symbol at the indicated position, update document information, edit the updated document information by an editing means, store the edited document information in a document storage means, transfer the document information laid-out by the editing means to an output means for further outputting the information.

(2) In the present invention, a document information processing device has facilities, in addition to facilities described in the item (1), to retrieve a position for storing character information relating to the symbol information from the position specified by the input position indicating means, discriminate whether the specified position indicates a position on the symbol, and detect a position for storing the symbol information.

(3) In the present invention, a document information processing device has facilities to retrieve frontward or backward from a position specified by the input means two symbols of the same kind for grouping a plurality of horizontal or vertical character lines, which exist in the same horizontal or vertical line, synthesize two detected symbols into one symbol, update document information, edit the updated document information by an editing means, store the edited document information in a document storage means, transfer the document information laid-out by the editing means to an output means for further outputting the information.

(4) In the present invention, a document information processing device has facilities, in addition to facilities described in the item (3), to retrieve the symbol information toward the top and the end of a text from a position specified by the input position indicating means, detect frontward and backward symbols of the same kind in the same horizontal or vertical line and detect the symbol information storing positions.

(5) In the present invention, a document information processing device is able to elongate a symbol or graphic symbol extending over a plurality of character lines and, at the same time, automatically enter a line-feed or half-line-feed code between horizontal character lines grouped by a vertically extending symbol or place a blank character between vertically written characters grouped by a horizontally extending symbol or evenly re-arrange lines or characters within the increased length of the symbol by using a evenly allocating facility.

(6) In the present invention, a document information processing device has a function to unify a format of an area grouped by a symbol when a symbol edited by the editing means for grouping a plurality of horizontal or vertical character lines extends over the boundary of two differently formatted areas.

(7) In the present invention, a document information processing device is able to recognize an area of plural horizontal or vertical character lines enclosed by paired brackets or graphic symbols as a specified area when only one point of one symbol is indicated by a cursor.

(8) In the present invention, a document information processing device is able to recognize a whole area of plural horizontal or vertical character lines grouped by a bracket or graphic symbol as a specified area of the lines when only one point of the symbol is indicated by a cursor.

BRIEF DESCRIPTION OF THE DRAWINGS

FIG. 10 shows an example of blank characters according to the present invention.

FIG. 12 shows variation of representable extending brackets each for grouping a plurality of character lines according to the present invention, which are designated by numerals 1–5 indicating respective featured parts.

FIG. 13 shows numbers indicating kinds of extending brackets each for grouping a plurality of character lines according to the present invention.

FIG. 14 shows flags for indicating directions of extending brackets for grouping a plurality of character lines according to the present invention.

PREFERRED EMBODIMENT OF THE INVENTION

Figure 1:
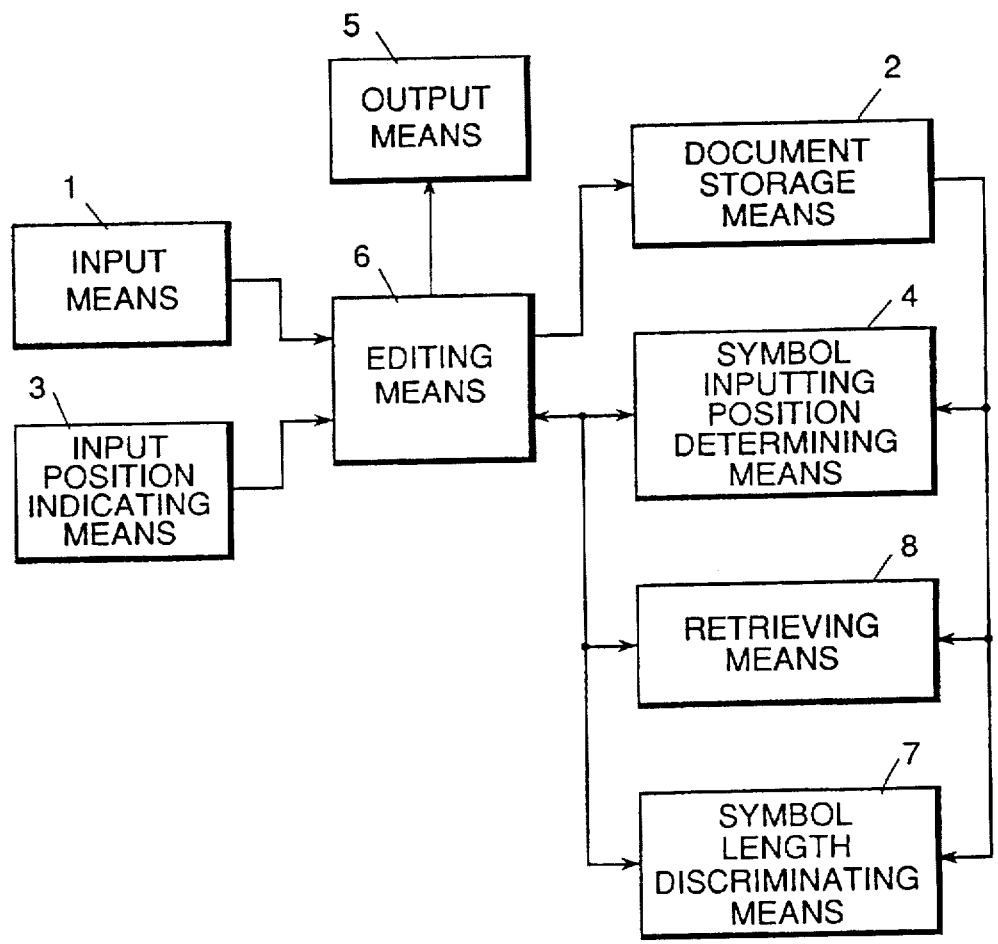
FIG. 1 is a block circuit diagram showing a basic construction of a document information processing device embodying the present invention.

FIG. 1 shows a basic structure of a document information processing device according to the present invention.

The present invention provides a document information processing device which comprises: an input means 1 for inputting document information and symbols extending over a plurality of horizontal or vertical lines of characters; a document storage means 2 for storing the document information and the symbol information; an input position indicating means 3 for indicating an inputting position in the document information; a symbol inputting position determining means 4 for determining a position of inputting the symbol with reference to the position indicated by the input position indicating means 3 according to the document information from the document storage means 2; a retrieving means 8 for retrieving the symbol information in the document storage means 2 from the position specified by the input position indicating means 3; an editing means 6 for editing the document information inputted through the input means 1, storing edited information into the document storage means 2 and laying-out document information from the document storage means 2; and an output means 5 for outputting the laid-out information received from the editing means 6.

The present invention also provides a document information processing device characterized in that the input position indicating means 3 is provided with a symbol length discriminating means 7 for detecting the symbol information stored in the document storage means 2 when a position of the inputted symbol (bracket) extending over a plurality of character lines has been inputted through the input means 1 and indicated by the input position indicating means 3; a symbol length discriminating means 7 for discriminating the detected symbol length; and an editing means 6 that is able to change information on the symbol having the length discriminated by the symbol length discriminating means 7 to a symbol having a length divided at a position specified by the input position indicating means 3 or to change the information on the divided symbol having a divided length to a symbol having a full length before having been divided and to set the symbol at the specified position and store the symbol information in the document storage means 2.

The present invention also provides a document information processing device which is characterized in that the symbol inputting position determining means 4 is provided with a symbol retrieving means 8 for retrieving the symbol information from the position specified by the input means 1; a symbol length discriminating means for discriminating the symbol length information searched in the direction toward the top of the text thereof and the symbol length searched in the direction toward the end of text thereof; and an editing means 6 that is able to change the symbol length information detected by searching in the direction toward the top of the text to the symbol length information determined between the symbol position detected by searching in the direction toward the the end of the text and the final length position discriminated by the symbol length discriminating means 7, set the changed length information and store it in the document storage means.

The present invention provides a document information processing device characterized in that the editing means 6 is able to enter a single- or half-line-feed code between lines of characters or place a blank character between characters in lines grouped by a symbol in synchronism with increasing the symbol length to that specified by the input position indicating means 3 and then to store the edited information into the document storage means 2.

The present invention provides a document information processing device characterized in that the editing means 6 unifies a format of an area grouped by a symbol when said symbol grouping a plurality of character lines extends over the boundary of two differently formatted areas.

The present invention provides a document information processing device characterized in that the editing means 6 can detect symbol information to be paired with the symbol at a position indicated by the input position indicating means 3 in the document storage means 2 and can recognize the area grouped by the symbol having the length discriminated by the symbol length discriminating means 7 as a designated area to be edited.

The present invention provides a document information processing device characterized in that the editing means 6 can detect symbol information at a position specified by the input position indicating means 3 in the document storage means 2, discriminate the symbol length by the symbol length discriminating means 7 and recognize a whole area of lines grouped by the symbol as a designated area to be edited.

The input means 1 and the input position indicating means 3 may be usually a keyboard or pointing device such as a pen or mouse or track ball.

A RAM is preferably used as the document storage means 2. An external memory such as a hard disk or a floppy disk may also be used.

The output means 5 may be usually a display device such as CRT display and LCD display or a printing device such as a printer.

It is preferred to use a microcomputer composed of a CPU, a RAM, a ROM, an I/O interface and a timer to cover the editing means 6, the symbol inputting position determining means 4 and the symbol length discriminating means 7. It is also preferable to control above-mentioned means from a software stored in the ROM.

Referring to FIGS. 2 to 21, a document information processing device embodying the present invention will be described in case of inputting a bracket grouping a plurality of horizontal character lines. However, it must be understood that the device is not limited to the shown application but may similarly treat with a bracket grouping a plurality of vertial lines or any other symbol relating to a plurality of character lines.

Figure 2:
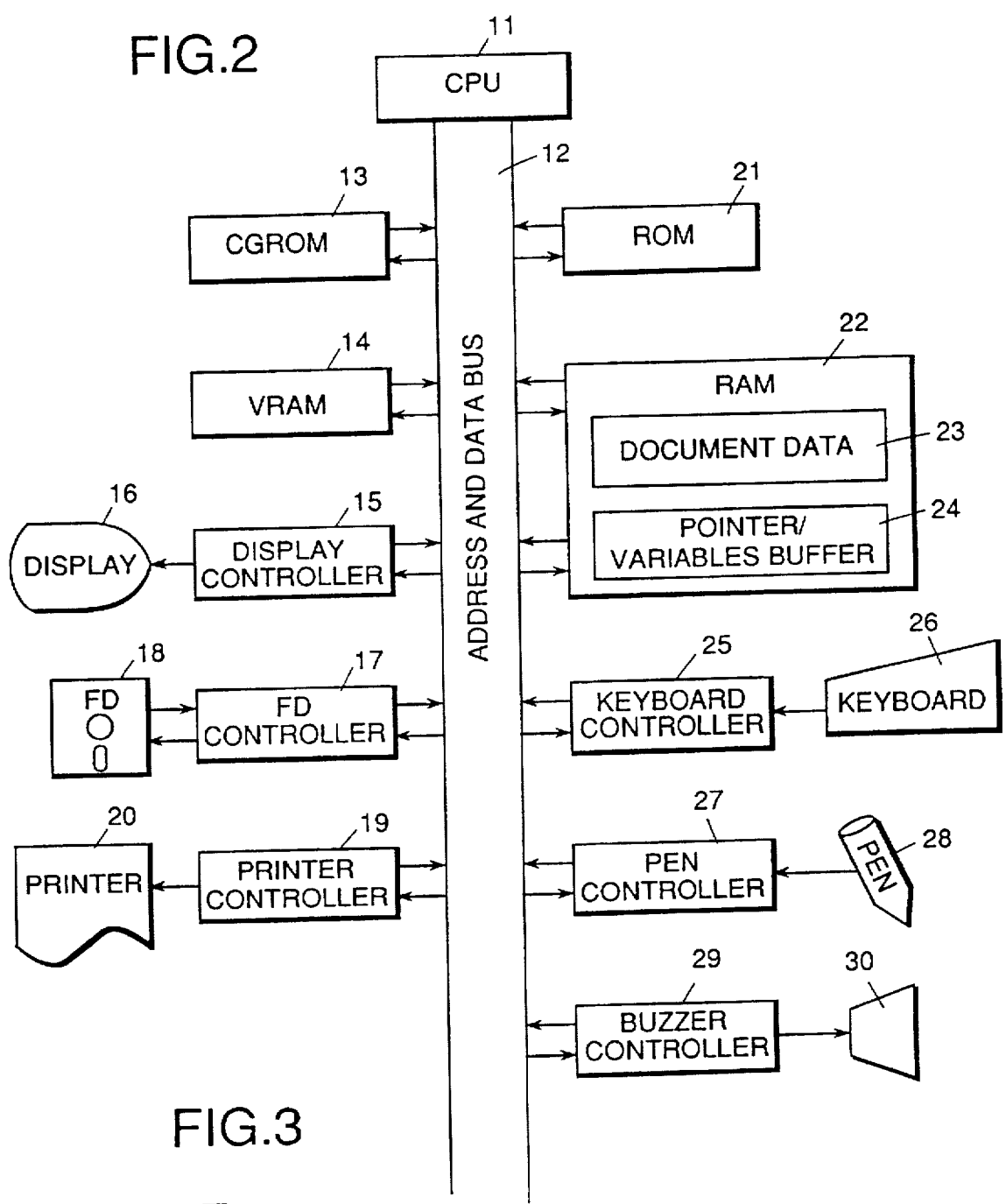
FIG. 2 is a block circuit diagram showing a hardware structure of an information processing device according to the present invention.

FIG. 2 is a block circuit diagram showing a hardware structure of an embodiment of the present invention. The shown system includes a central processor (CPU) 11 for controlling a whole system and transferring data by performing a program stored in a ROM (read-only memory) 21; an address and data bus 12 for transferring data between the system components; a CGROM (character-generating read-only memory) 13 for storing a bit map of characters and symbols to be displayed and printed and outline font data; a VRAM (virtual random-access memory) 14 that has an address system corresponding evenly to the coordinates of the display screen and keeps a bit map of the current screen image; a display controller 15 for real-time displaying a screenful data stored in VRAM 14 on a screen of a display device 16 such as a liquid-crystal display or CRT; a FD controller 17 for control a floppy disk drive 18 to store and call document information; a printer controller 19 for control a printer 20 to print-out document data stored in the ROM 21, calling font data from the CGROM 13.

A ROM 21 contains a control program usable by the CPU 11 for controlling the system. A RAM 22 is used as pointer-variable buffer 24 (an area used for storing various kinds of pointers, remarkable characters and remarkable lines in flow charts 15–20) for storing document data 23 (including graphic data, ruler data, brackets data) and data to be used by the CPU 11 when controlling the system and editing document. Numeral 25 denotes a keyboard controller for transferring key codes inputted through a keyboard 26 to the CPU 11, 27 denotes a pen controller for transferring a state signal of a pen input device 28 (indicating its pen being in or out of contact with the input display screen) and coordinates of the pens contact on the screen to the CPU 11, and 29 denotes a buzzer controller 29 for operating a buzzer 30.

Figure 3:
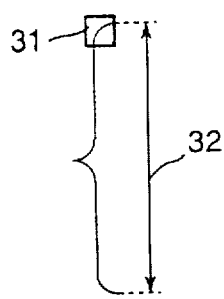
FIG. 3 is a view showing portions of an extending bracket used for grouping a plurality of character lines according to the present invention.

FIG. 3 indicates a bracket usable for grouping a plurality of character lines: a bracket code position (for inputting a bracket symbol) is shown at 31 and a bracket length is shown at 32.

Figure 4A:
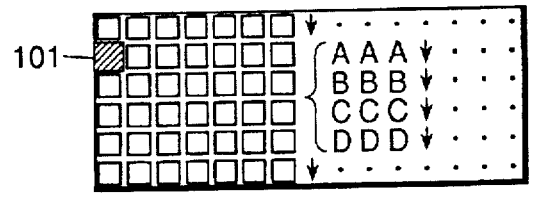
FIGS. 4A, 4B, 4C, 4D and 4E show an example of a sequence of operations to divide an extending bracket grouping a plurality of character lines in a conventional document processing device.
Figure 4B:
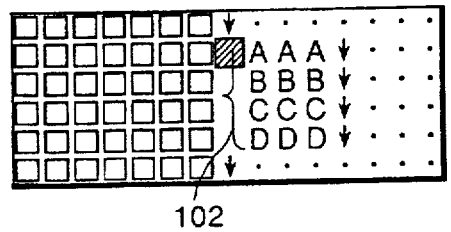
Figure 4C:
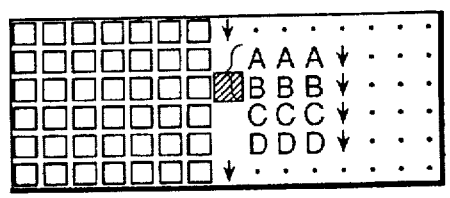
Figure 4D:
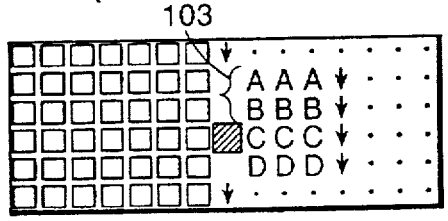
Figure 4E:
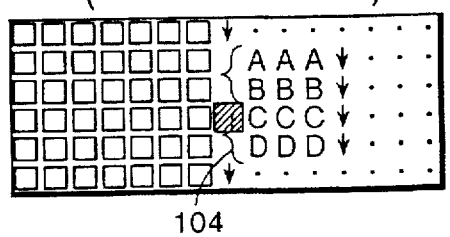

FIGS. 4A to 4E show an example of a sequence of operations to divide an extending bracket grouping a plurality of character lines in a conventional document processing device. Starting from FIG. 4A showing a text image with a cursor 101 located at a shown position thereof, a bracket 102 grouping four lines of characters as shown in FIG. 4B will be divided into two brackets each grouping two character lines as shown in FIG. 4E. This is realized by moving the cursor to a position shown in FIG. 4B, shortening the bracket 103 as shown in FIG. 4C or deleting the bracket 103 followed by entering a shortened bracket 103 as shown in FIG. 4C, moving the cursor to a position shown in FIG. 4D and entering a bracket 104 of a desired length as shown in FIG. 4E.

Figure 5A:
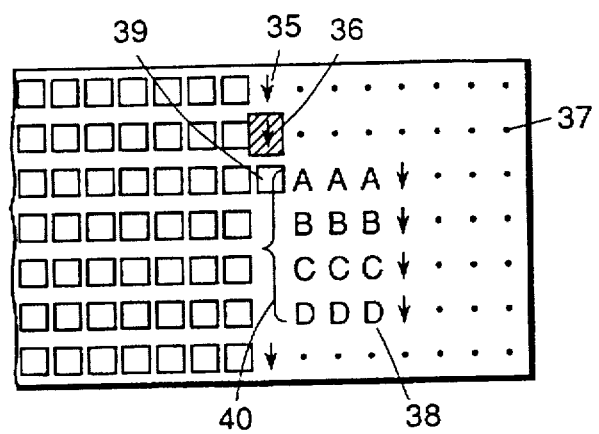
FIGS. 5A, 5B and 5C are views for explaining how to divide an extending bracket for grouping a plurality of character lines according to the present invention.
Figure 5B:
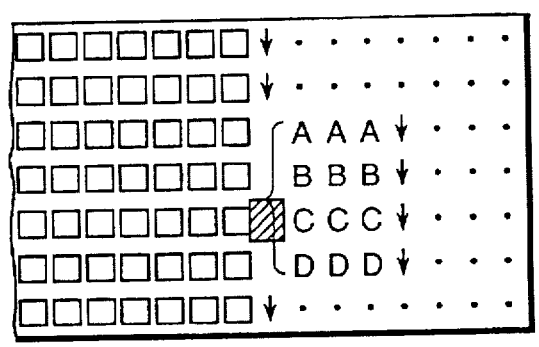
Figure 5C:
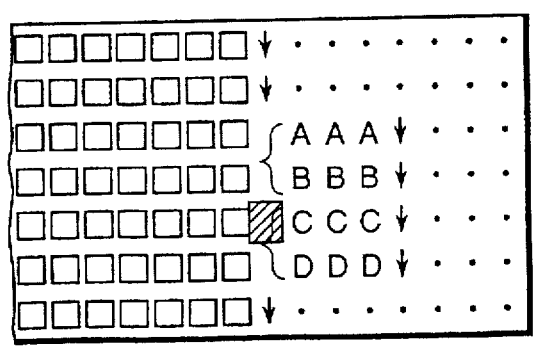

FIGS. 5A to 5C are views for explaining how to divide an extending bracket grouping a plurality of character lines according to the present invention.

FIG. 5A shows the bracket having been inputted in text. Numeral 35 is a line-feed code, 36 is a cursor indicating an input position, 37 is a free area, 38 is an ordinary character (e.g., alphabetical character), 39 is a code position of bracket for grouping a plurality of character lines and 40 is an inputted bracket for grouping a plurality of character lines. Arrangement of blank characters (Table of FIG. 8) and other characters shown in FIG. 5A corresponds evenly to arrangement of characters in document data 23.

FIG. 5B shows that the cursor has been moved to a position for dividing the inputted bracket, where the bracket can be divided into two brackets shown in FIG. 5C by single operation (an instruction to divide the bracket).

Figure 6A:
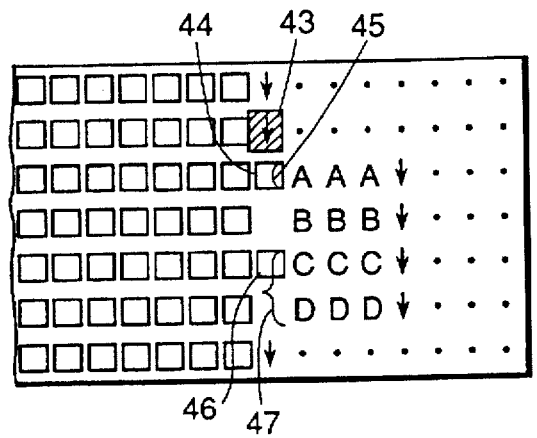
FIGS. 6A, 6B and 6C are views for explaining how to synthesize an extending bracket for grouping a plurality of character lines according to the present invention.
Figure 6B:
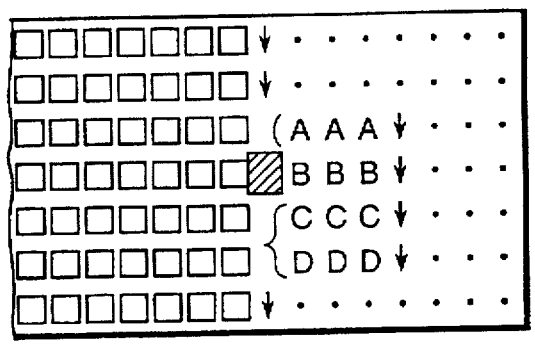
Figure 6C:
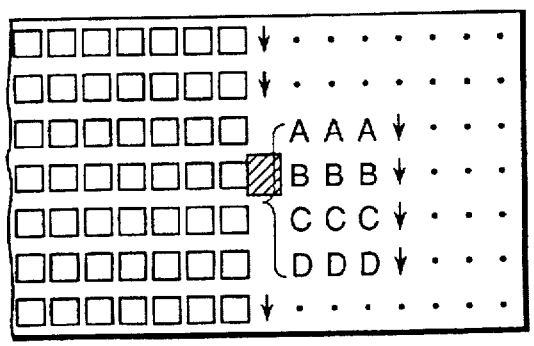

FIGS. 6A to 6C are views for explaining how to synthesize a bracket grouping a plurality of character lines according to the present invention.

FIG. 6A shows two brackets which have been inputted in a text to group plural lines of characters respectively. Numeral 43 is a cursor indicating an input position, 44 is a bracket code position, 45 is an inputted bracket, 46 is a code position of a bracket for grouping a plurality of character lines and 47 is an inputted bracket grouping a plurality of character lines.

FIG. 6B shows that the cursor has been moved to a position for synthesizing a bracket, where the bracket can be synthesized as shown in FIG. 6C by single operation (an instruction to synthesize the bracket grouping a plurality of character lines).

Figure 7A:
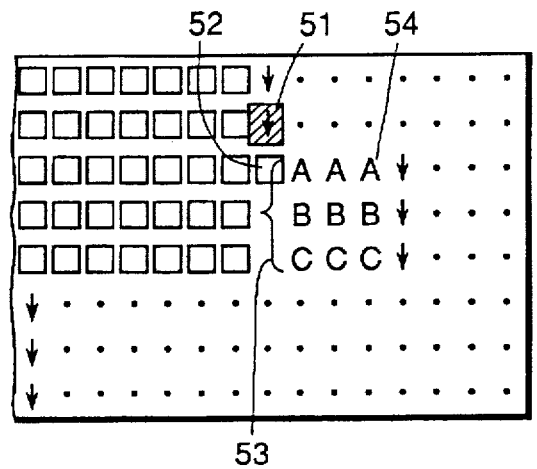
FIGS. 7A, 7B and 7C are views for explaining how to elongate a length of an extending bracket for grouping a plurality of character lines according to the present invention.
Figure 7B:
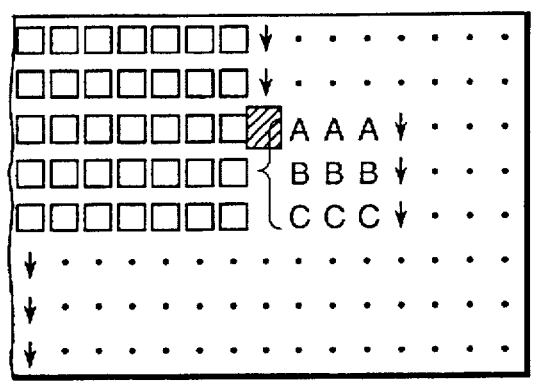
Figure 7C:
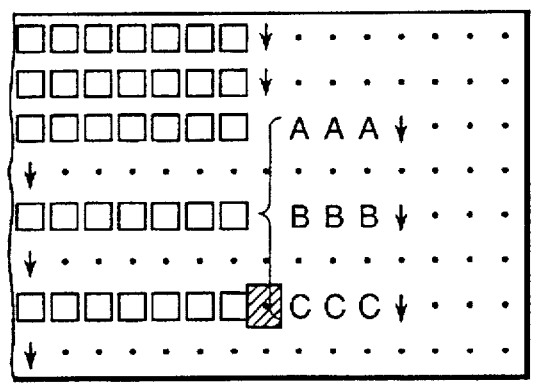

FIGS. 7A to 7C are views for explaining how to expand (elongate) a bracket grouping a plurality of character lines according to the present invention.

FIG. 7A shows an inputted bracket grouping a plurality of character lines. There is shown a cursor 51 indicating an input position and a bracket code position 52 and an inputted bracket 53 grouping lines of ordinary (e.g., alphabetic) characters 54.

FIG. 7B shows that the cursor has been moved to a code position of the bracket grouping a plurality of character lines.

FIG. 7C shows that the bracket has been expanded (increased in length) and, at the same time, a single or half line-feed code has been inserted between lines grouped by the bracket. According to the present invention, it is possible to transfer the stage of FIG. 7B into the stage of FIG. 7C by single operation (by giving an instruction for expanding a bracket grouping a plurality of character lines).

Figure 8A:
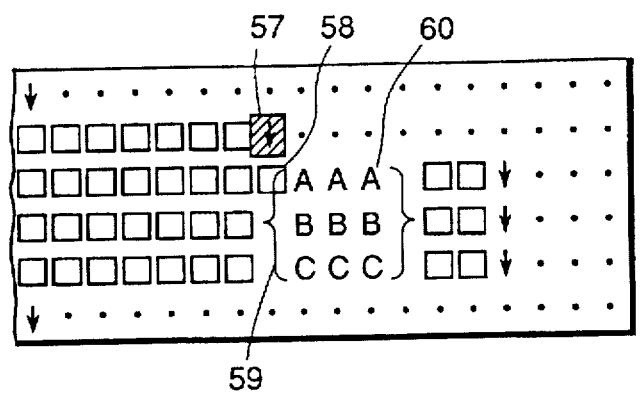
FIGS. 8A, 8B and 8C are views for explaining how to designate an area of a plurality of character lines enclosed in paired brackets is placed according to the present invention.
Figure 8B:
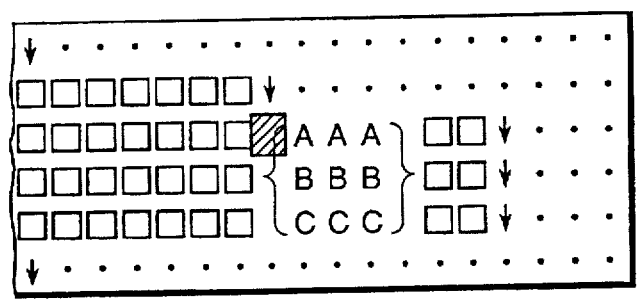
Figure 8C:
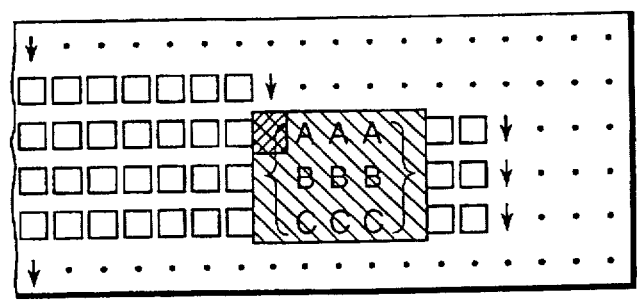

FIGS. 8A to 8C are views for explaining how to designate an area enclosed in two paired brackets grouping a plurality of character lines according to the present invention.

FIG. 8A shows two paired brackets which have been inputted to put therein plural lines of characters. Numeral 57 is a cursor indicating an input position, 58 is a bracket code position, 59 is an inputted bracket, 60 is an ordinary (e.g., alphabetic) character.

FIG. 8B shows that the cursor has been moved to a code position of the top bracket leading a plurality of character lines.

FIG. 8C shows an area enclosed in two brackets (for single character line) or two extending brackets (for plural character lines). According to the present invention, it is possible to turn the stage of FIG. 8B into the stage of FIG. 8C by single operation (by giving an instruction for designating an area on the extending bracket).

Figure 9A:
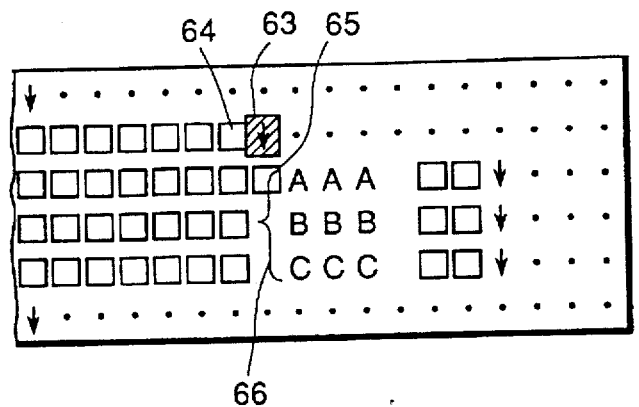
FIGS. 9A, 9B and 9C are views showing a designated area of character lines grouped by an extending bracket according to the present invention.
Figure 9B:
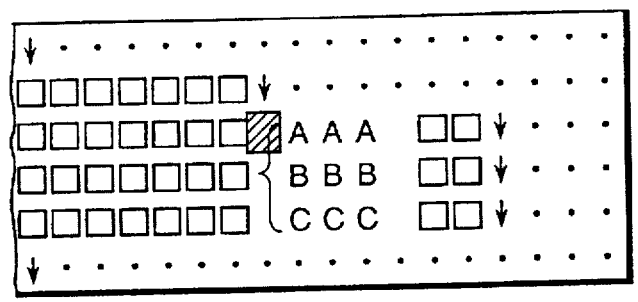
Figure 9C:
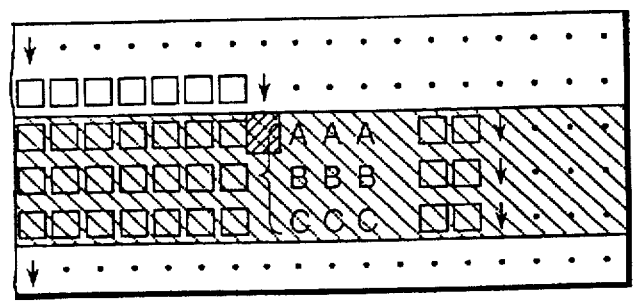

FIGS. 9A to 9C are views for explaining how to designate an area of lines grouped by an extending bracket according to the present invention.

FIG. 9A shows an input bracket grouping a plurality of character lines. Numeral 63 is a cursor indicating an input position, 64 is a bracket code position, 65 is an input bracket, 66 is an ordinary (e.g., alphabetic) character.

FIG. 9B shows that the cursor has been moved to a code position of the bracket grouping plurality of character lines.

FIG. 9C shows an area of character lines grouped by the extending bracket. According to the present invention, it is possible to turn the stage of FIG. 9B into the stage of FIG. 9C by single operation (by giving an instruction for designating an area on the extending bracket).

FIG. 10 shows an exemplified blank character. Character data in document may be classified into blank characters and other ordinary characters. Blank character data may be represented for example by a blank character code 69, a line-feed code 70, a free-area code (still unoccupaied area) 71 and so on. Arrangement of the blank character data shown in a table of FIG. 10 and other character data corresponds evenly to arrangement of characters in the document data 23 stored in the RAM shown in FIG. 3.

Figure 11:
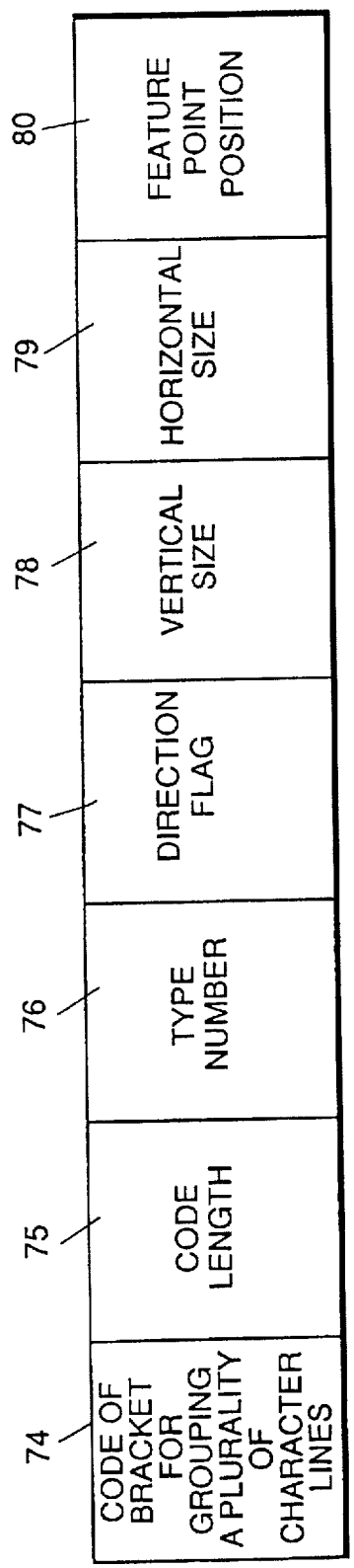
FIG. 11 shows information on an extending bracket for grouping a plurality of character lines according to the present invention.

FIG. 11 shows information on an extending bracket, which is a code position of an extending bracket in the document data 23 shown in FIG. 3. In FIG. 11, there is shown an extending bracket code 74, an extending bracket code length 75, an extending bracket type-number 76 (to be shown in FIG. 13), a direction flag 77 (to be shown in FIG. 14), an extending bracket vertical size 78, extending bracket horizontal size 79 and an extending bracket feature-point position 80 (to be shown in FIG. 12).

FIG. 12 is illustrative of extending brackets which are defined to have the same length of 5 and have respective feature points denoted by corresponding position numbers. As shown in FIG. 12, an extending bracket having no feature point is given 0, a bracket having a feature point at the top line is given 1 and proceeding brackets having their feature points at the second, third, fourth and fifth lines are given 2, 3, 4 and 5 respectively. The number 5 also corresponds to the bracket length.

FIG. 13 shows type numbers of extending brackets which are classified mainly into brackets each having a feature point and brackets having no feature point as illustrated in the table.

FIG. 14 shows a table of flags marking directions of extending brackets. Flags 3 and 4 indicate brackets used for grouping a plurality of vertical character lines.

Figure 15:
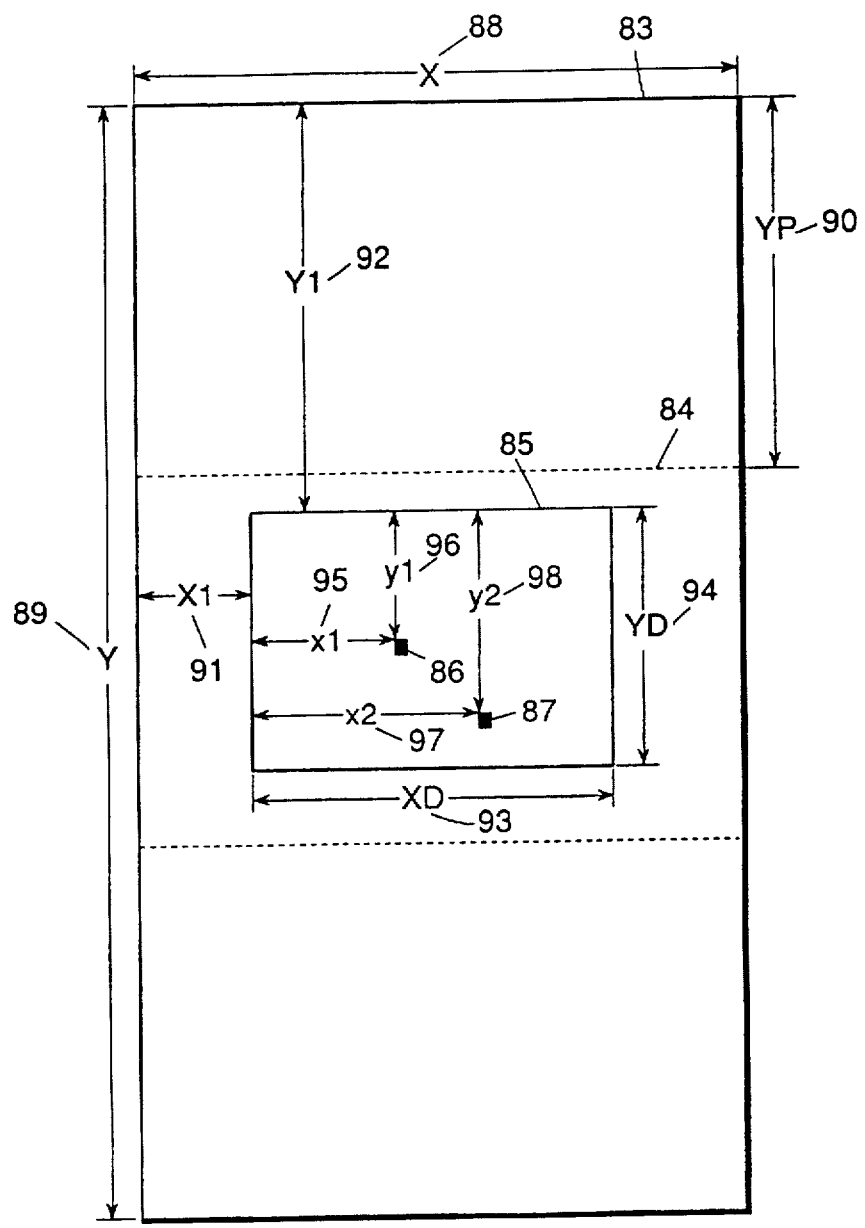
FIG. 15 shows a coordinate relationship between a whole document and an extending bracket to be inputted therein for grouping a plurality of character lines thereof according to the present invention.

FIG. 15 is a view showing a relation of coordinates of an input position of an extending bracket to coordinate system of a whole document. Numeral 83 shows a layout of whole document DATA from the first to the last page, which is stored in the RAM 22 shown in FIG. 3. Numeral 84 is a page boundary; 85 is an area being currently edited, which is now indicated on a display 16 as developed in form of bit map on the VRAM 14; 86 is a starting position of an input; 87 is an end position of an input; 88 is the number of characters in a line (X); 89 is the number of all lines in a document; 90 is the number of lines in a page (YP); 91 is the abscissa (X1) of a left top point (origin) of a currently editing area relative to the left top (origin) of the whole document; 92 is the ordinate (Y1) of a left top point (origin) of a currently editing area relative to the left top (origin) of the whole document; 93 is the number of horizontally arranged characters (XD) within the editing area 85; 94 is the number of vertical lines (YD) within the editing area 85; 95 is the abscissa (x1) of the starting point position of the input relative to the origin of the editing area; 96 is the ordinate (y1) of the starting point position of the input relative to the origin of the editing area; 97 is the abscissa (x2) of the end point position of the input relative to the origin of the editing area; and 98 is the ordinate (y1) of the end point position of the input relative to the origin of the editing area.

In the shown embodiment of the present invention, an extending bracket (for grouping a plurality of character lines) is inputted according to flow-charts shown in FIGS. 16 through 21.

Figure 16:
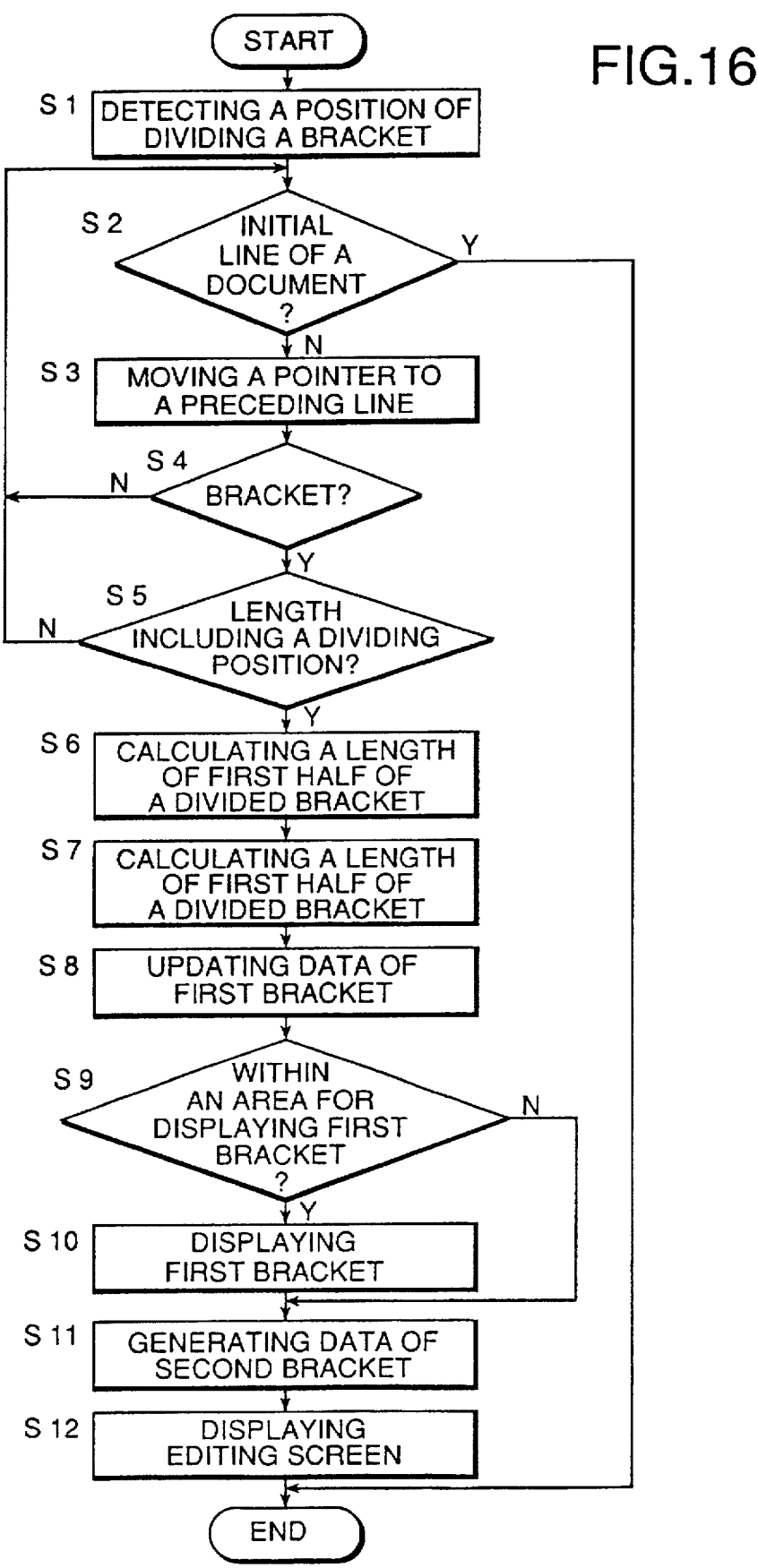
FIG. 16 is a flow chart representing a sequence of operations to divide an extending bracket grouping a plurality of character lines by a preferred embodiment of the present invention.

FIG. 16 is a processing flow-chart for dividing an extending bracket in the embodiment. Screen image information in the VRAM 14 of FIG. 3 can be indicated in real-time on the display 16 through the display controller 15. Accordingly, the display program stored in the ROM 21 may be a control procedure for composing bit map displaying data for the VRAM 14 from the document data 23 in the RAM 22 with reference to a bit map or outline data on characters and symbols stored in the CGROM 13.

At Step S1, a bracket dividing position designated by the input position indicating means 3 (FIG. 2) is determined at its character line position from the ordinate (Y1) of the editing area origin with reference to the document origin and the ordinate (y1) of the input indicating position with reference to the editing area origin and the obtained coordinate values is set on a pointer, then the processing is transferred to Step S2.

Step S2 discriminates whether the ordinate (y) indicated by the pointer relates to a top line of the document or not. The processing proceeds to Step S3 if the ordinate (y) does not relate to the origin of the document. The processing is finished if the input indicating position is the top line of the document.

Step S3 updates the line data on the pointer by the preceding line and proceeds to Step S4.

Step S4 detects a control code of the position indicated by the pointer and returns to Step S2 if the detected code does not relate to an extending bracket (i.e., a bracket for grouping a plurality of character lines).

Step S5 detects a vertical size 78 of the extending bracket (FIG. 11) from extending bracket control information and advances the processing to Step S6 if the extending bracket has a length exceeding the input indicating position from the extending bracket control-code position. If not, the processing is returns to Step S2.

Step S6 determines the length of preceding one of two brackets to be formed after dividing the existing bracket in such a manner that the number of lines between the control-code detection position indicated by the pointer and the designated dividing position is reduced by one and hence the length of the first bracket is determined.

Step S7 determines the length of a proceeding bracket as the length from the designated dividing position to the bracket end position. After obtaining the length values of two brackets to be produced, the procedure proceeds to Step S8.

At Step S8, a value of vertical size 78 in the extending bracket control-code stored at the position indicated by the pointer is updated to reflect the bracket length value determined at Step S6 and then the procedure proceeds to Step S9.

If the prepared bracket data has a part included in an editing area 85, its end position (xe, ye) is expressed in terms of (xs+horizontal size 79, ys+vertical size 78) where ys denotes a line currently being processed and xs denotes a position of character currently being processed in the document data 23.

Step S9 discriminates whether all conditions of xe~X1, xs X1+XD, ye~Y1 and ysY1+YD are satisfied or not. The procedure proceeds to Step S10 or S11 if so or not so.

Step S10 transfers data of the extending bracket part being in the editing area to the VRAM 14 for displaying the data and proceeds to Step S11.

Step S11 updates the vertical size 78 in the extending bracket control code detected at Step S4 the bracket length value determined at Step S7, advances a character of a designated dividing position to next one (a designated dividing position plus a code length 75 if an extending bracket code), inserts the extending bracket information and then proceeds to Step S12.

Step S12 transfers data on the extending bracket part being in the editing area to the VRAM 14 for displaying the data and finishes the processing.

Figure 17:
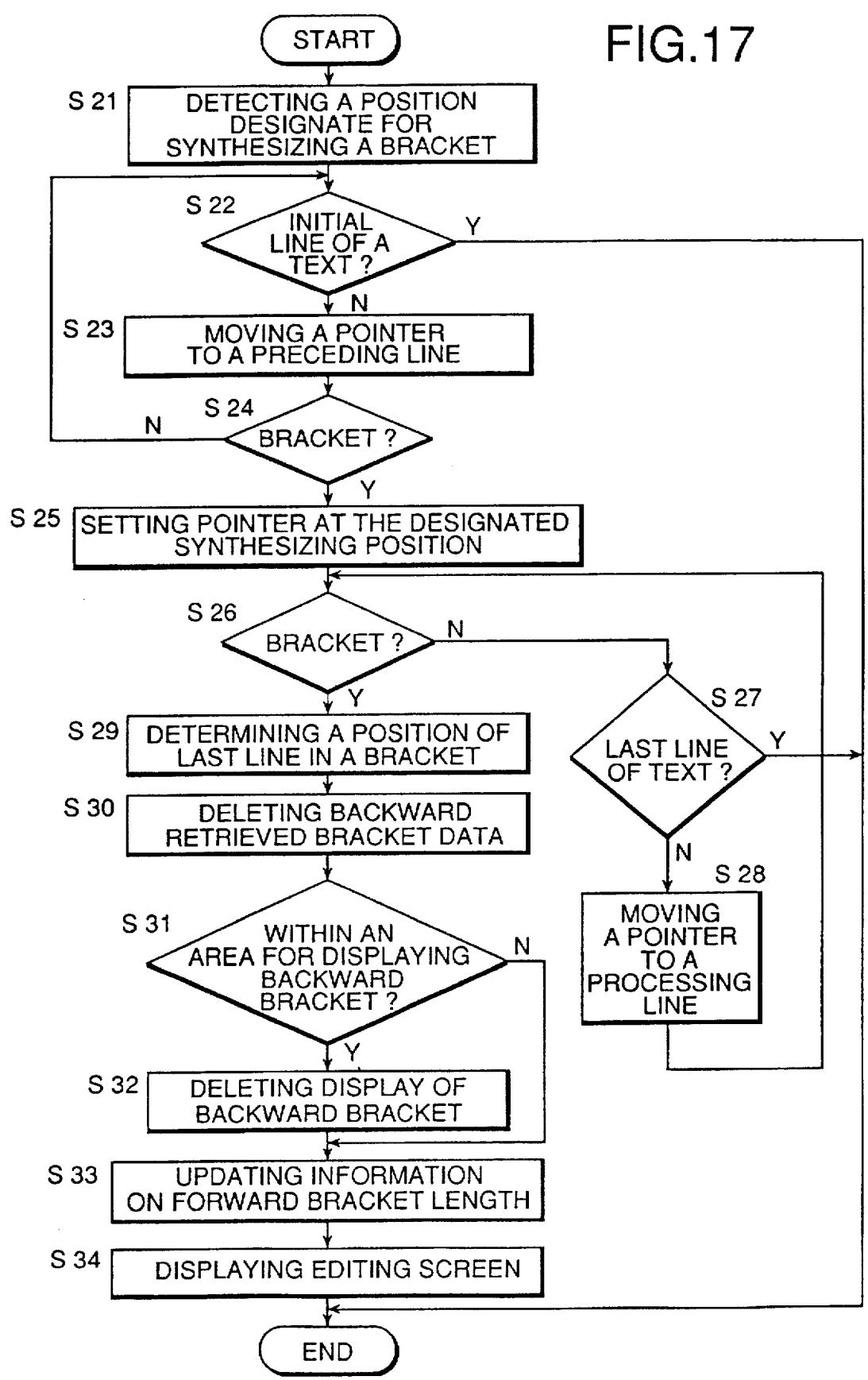
FIG. 17 is a flow chart representing a sequence of operations to synthesize an extending bracket grouping a plurality of character lines by a preferred embodiment of the present invention.

FIG. 17 is a processing flow chart of synthesizing an extending bracket according to the present invention.

At Step S21, an input position designated by the input position indicating means 3 is determined at its character line position from the ordinate (Y1) of the editing area origin with reference to the document origin and the ordinate (y1) of the designated input position with reference to the editing area origin and the obtained coordinate values are set on the pointer, then the processing is transferred to Step S22.

Step S22 discriminates whether the ordinate (y) indicated by the pointer relates to a top line of the document or not. The processing proceeds to Step S23 if the ordinate (y) does not relate to the origin of the document. The processing is finished if the designated inputting position is the top line of the document.

Step S23 updates the line data on the pointer by the preceding line data and proceeds to Step S4.

Step S24 detects a control code of the position indicated by the pointer, keeps the position data and proceeds to Step S25 when the detected control code is an extending bracket code. The processing returns to Step S22 if the detected code does not relate to an extending bracket.

Step S25 sets coordinate data of the designated input position at the pointer and proceeds to Step S26.

Step S26 detects a control code of the position indicated by the pointer and proceeds to. Step S29 when the detected code relates to an extending bracket. If not, the processing proceeds to Step S27.

Step S27 discriminates whether the ordinate (y) indicated by the pointer relates to the last line of the document or not. The processing proceeds to Step S28 if the ordinate (y) does not relate to the last line of the document, while the processing is finished if the input indicating position is the last line of the document.

Step S28 updates the pointer to the proceeding line and returns to Step S26.

Step S29 detects a vertical size 78 of the extending bracket from the extending bracket control data detected at Step S26, determines the last position of the extending bracket from the pointer position and the vertical size value and transfers the processing to Step S30.

Step S30 moves a proceeding character to the position of the extending bracket control code detected at Step S26, deletes the extending bracket data and proceeds to Step S31.

If the deleted bracket data has a part included in an editing area 85, its end position (xe, ye) is expressed in terms of (xs+horizontal size 79, ys+vertical size 78) where ys denotes a line under processing and xs denotes a character position under processing in the document data 23.

Step S31 discriminates whether all conditions of xe~X1, xsX1+XD, ye~Y1 and ysY1+YD are satisfied or not. The processing proceeds to Step S32 or S34 if so or not so.

Step S32 deletes data of the extending bracket part being in the editing area from the VRAM 14 and proceeds to Step S33.

Step S33 discriminates whether the position of the last one of lines grouped by the extending bracket, which is determined from the position of the extending bracket control-code detected at Step S24 and the value of the vertical size 78, is larger than the position of the last one of lines grouped by the extending bracket, which is determined at Step S29. If so, the processing is finished. If not, the vertical size 78 in the extending bracket control code detected at Step S24 is changed to the length value to the line position determined at Step S29. The processing then proceeds to Step S34.

At Step S34, data of the extending bracket part being in the editing area is transferred to the VRAM 14 for displaying the data and the processing ends.

Figure 18:
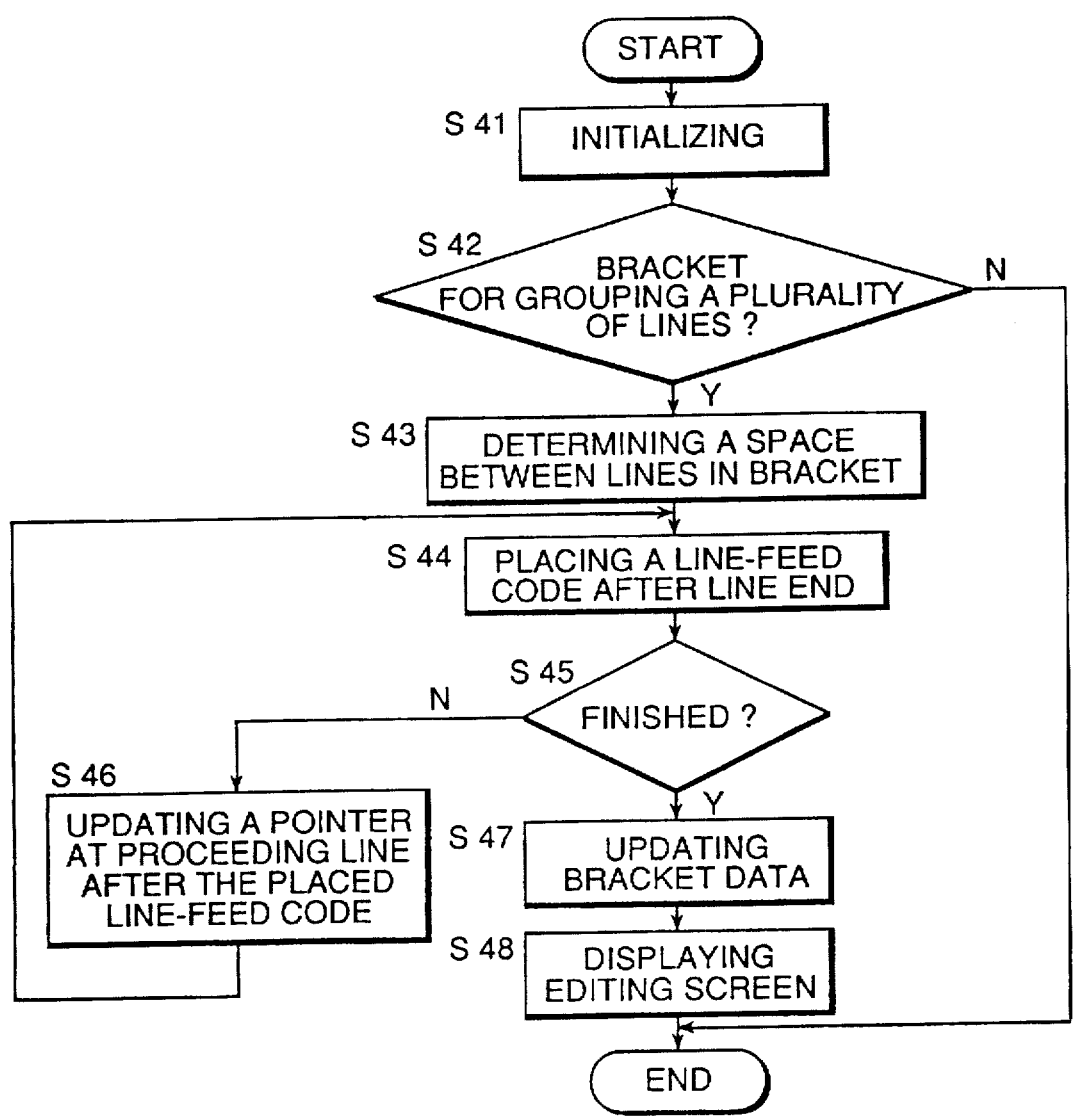
FIG. 18 is a flow chart representing a sequence of operations to elongate an extending bracket grouping a plurality of character lines by a preferred embodiment of the present invention.

FIG. 18 is a processing flow chart of expanding an extending bracket grouping a plurality of character lines and simultaneously inserting line-feed codes between lines according to the present invention.

At Step S41, a leading line in a document buffer is set as a line being currently processed and a top character in the leading line is set as a character being currently processed (by placing a pointer indicating an address of the top character in the document buffer 23 in the RAM). The processing then proceeds to Step S42.

Step S42 discriminates whether the current character pointer indicates an extending bracket or not. Step S42 proceeds to Step S43 when the pointer indicates the extending bracket. It finishes the processing if not so.

Step S43 detects a vertical size 78 of the extending bracket from the extending bracket control-data, determines the number of interlinear spaces to be provided each with a line-feed code by reducing 1 from the vertical size value and proceeds to Step S44.

Step S44 updates the current character pointer to the current line end, places a line-feed code at a position of "line end plus 1" and proceeds to Step S45.

Step S45 discriminates whether the line-feed codes have been inserted by one into all interlinear spaces determined at Step S43. The processing proceeds to Step S47 after the line-feed code insertion was completed and confirmed. If not, the processing proceeds to Step S46.

Step S46 updates the current character pointer to a line succeeding the line already provided with a line-feed code at Step S44 and returns to Step S44.

Step S47 updates the vertical size 76, detected at Step S43, of the extending bracket by adding the size of the inserted line-feed codes thereto. It transfers a part of the bracket data prepared at Step S43, which is included in the editing area 85, to the VRAM 14 for displaying and finishes the processing.

Figure 19:
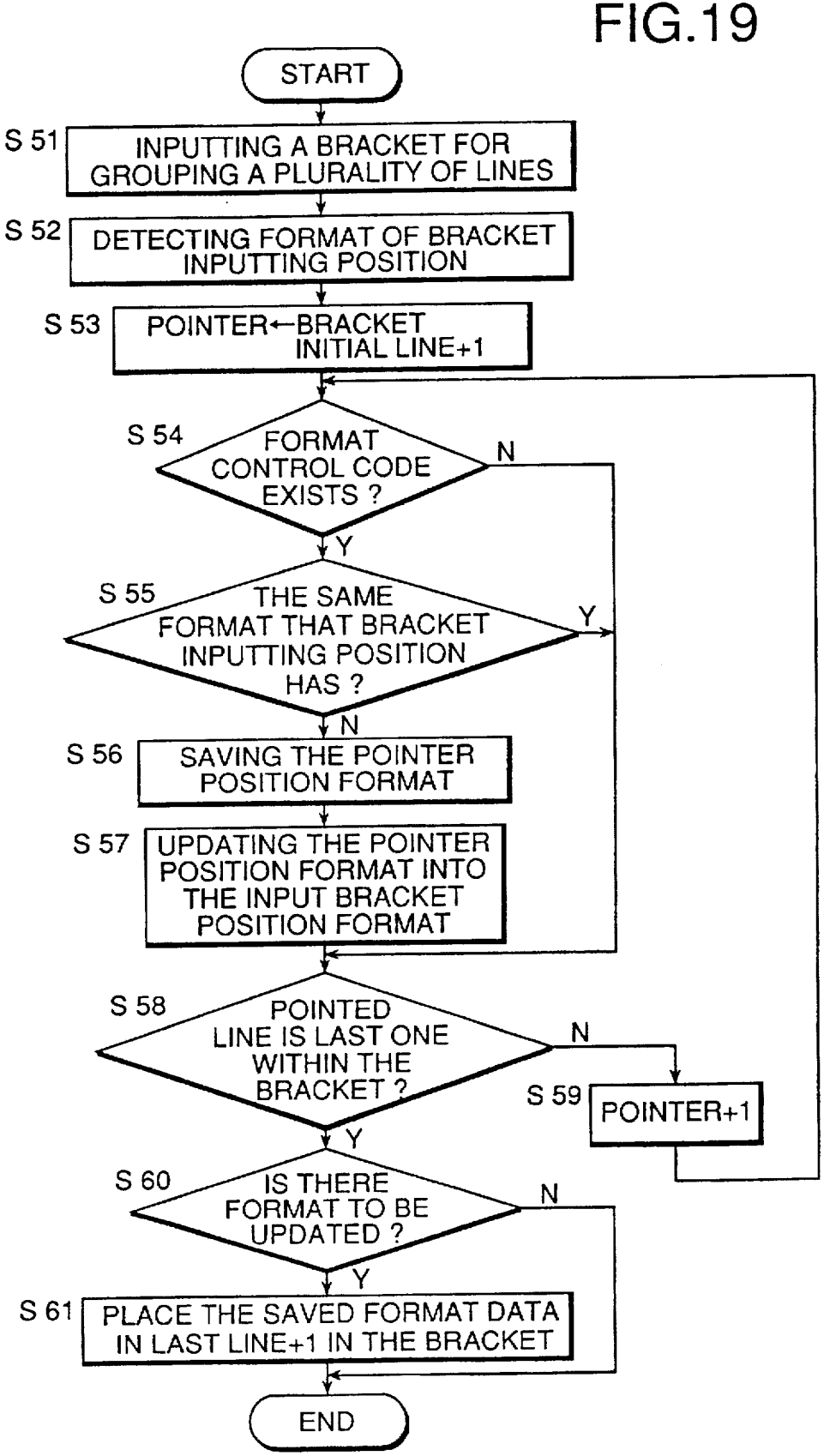
FIG. 19 is a flow chart representing a sequence of operations to unifying format within an extending bracket grouping a plurality of character lines by a preferred embodiment of the present invention.

FIG. 19 is a processing flow chart of unifying a format of an area within an extending bracket inserted as laid over the boundary between two differently formatted areas according to the embodiment of the present invention.

Step S51 reads a position of a cursor moved by a user through a keyboard 26 or an input position designated with a pen 28; sets a bracket type (see table of FIG. 13) to the type designated by the user or a previously selected type; selects a bit map in the CGROM 13 and an outline data according to the data of selectable extending brackets and writes the selected information into the VRAM at a position corresponding to the extending bracket inputting position; makes the selected information be temporarily displayed, for example, as selectable information 53 shown in FIG. 7A; and waits until the user gives an instruction "Selection OK" through the keyboard 26. Upon receipt of the instruction, Step S51 finally defines the input extending bracket and proceeds to Step S52.

Step S52 searches format control information in the text top direction from the position whereat the extending bracket was inputted at Step S51 and then proceeds to Step S53.

Step S53 sets the line position in which the extending bracket was inputted at Step S51 as a line being currently processed (hereinafter referred to as current line) and proceeds to Step S54.

Step S54 discriminates whether the current line contains a format control code or not. The processing proceeds to Step S55 when the current line contains the format control code. If not, it proceeds to Step S58.

Step S55 compares the format setting control code detected at Step S54 with the format setting control code detected at Step S52. It advances the processing to Step S58 when both codes are the same or to Step S56 when the both codes differ from each other.

Step S56 transfers the detected format setting control code to the buffer storing variables 24 and then proceeds to Step S57.

Step S57 transfers the format setting control code detected at Step S52 to the position of format setting control code in the document data and proceeds to Step S58.

Step S58 examines whether the current line is the last one of lines grouped by the extending bracket or not. Step S58 proceeds to Step S60 when the current line is the last one of lines grouped by the extending bracket. If not, it proceeds to Step S59.

Step S60 proceeds to Step S61 when the format information has been updated through Steps S54–S58. It finishes the processing if the format information has not been updated yet.

Step S61 transfers the format setting control code, which was transferred to the buffer for variables at Step S56, to a proceeding line after the last one of the lines grouped by the extending bracket and then finishes the processing.

Figure 20:
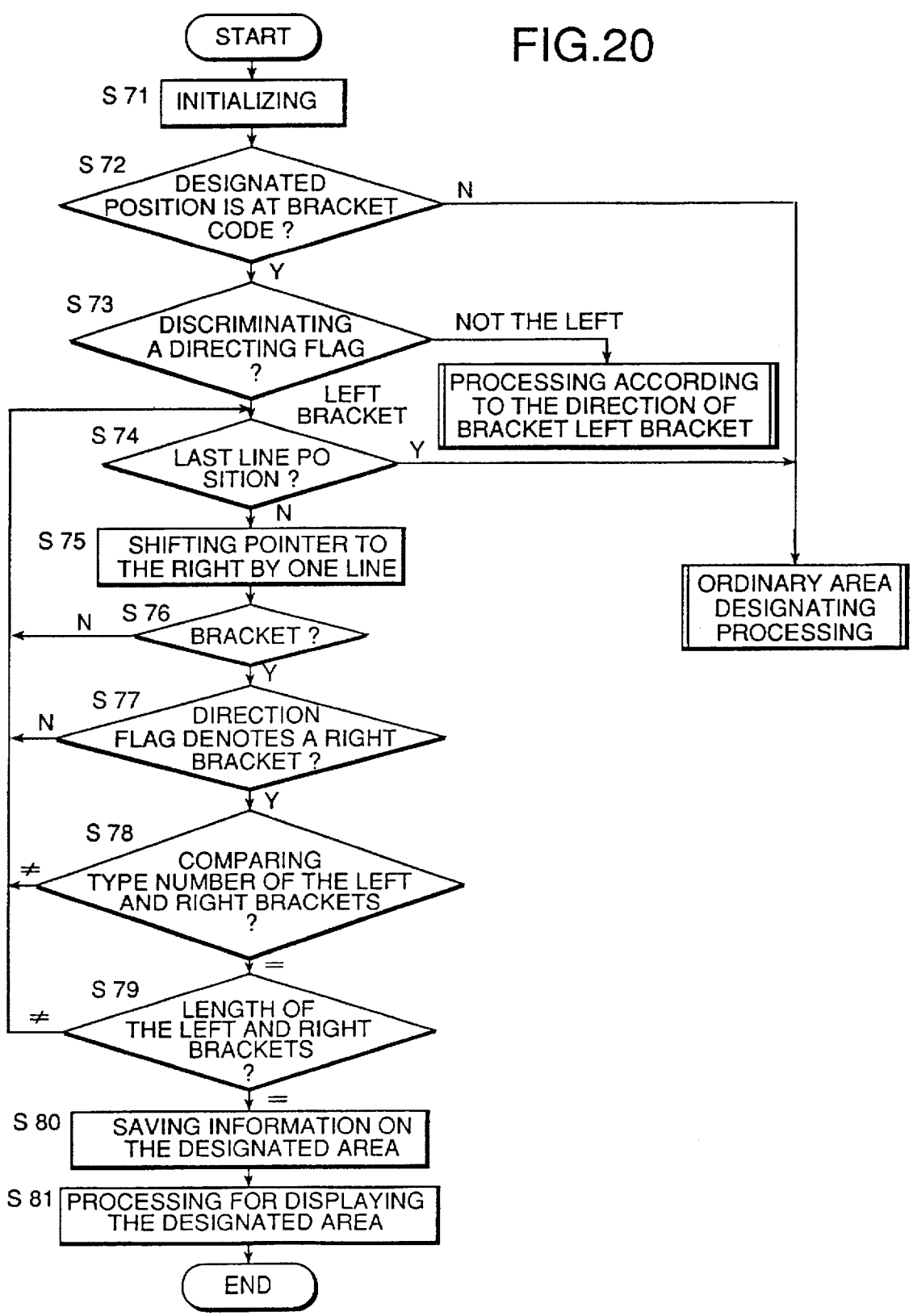
FIG. 20 is a flow chart representing a sequence of operations to specify an area of plural character lines put in brackets by a preferred embodiment of the present invention.

FIG. 20 is a processing flow chart of designating an area of lines grouped by an extending bracket in the embodiment of the present invention.

Step S71 designates a top line in the document data as a current line and the top character in the current line as a current character (by placing a current character pointer indicating an address of the top character in the document buffer 23 in the RAM) and proceeds to Step S79.

Step S79 examines whether the current character pointer indicates an extending bracket or not. The processing proceeds to Step S73 when the pointer indicates the extending bracket. If not, the ordinary area designation will be performed (explanation on this operation is omitted).

Step S73 detects a direction flag 77 from an extending bracket control-code and discriminates the direction marked by the flag.

Further processing will be described, by way of example, in case of a left bracket having been designated as the extending bracket grouping a plurality of character lines.

Step S74 examines whether the current character pointer locates out of the last column (vertical line) position in the current (horizontal) character line or not. The processing proceeds to Step S75 when the current character pointer is out of the last column position in the current line. The ordinary area designating operation is performed if the pointer exists at the last column position in the current line.

Step S75 moves the current character pointer to the right by one character, counts the number of shifted digits and proceeds to Step S76.

Step S76 discriminates whether the current character pointer indicates the extending bracket or not. The processing proceeds to Step S77 when the current character pointer indicates the extending bracket. If not, the processing returns to Step S74.

Step S77 examines which bracket—right or left—is indicated by the direction flag 77 detected at Step S76. The processing proceeds to Step S77 when the pointer indicates a right bracket. It returns to Step S74 when the pointer indicates a left bracket.

Step S78 compares type number 76 of the left bracket and the right bracket in the extending bracket control information and proceeds to Step S79 if both type numbers are the same. If not, the processing returns to Step S74.

Step S79 compares vertical sizes 78 of the left bracket and the right bracket in the extending bracket control information and proceeds to Step S80 when both vertical sizes are the same. If not, the processing returns to Step S74.

Step S80 saves area information for an area enclosed in two paired brackets to be designated.

At Step S81, a part of the designated area, which is in the editing area 85, is transferred to the VRAM 14 wherein said part is displayed for example in inverted black-and-white color in case of distinctly displaying the image on the display screen. The procedure is finished.

Figure 21:
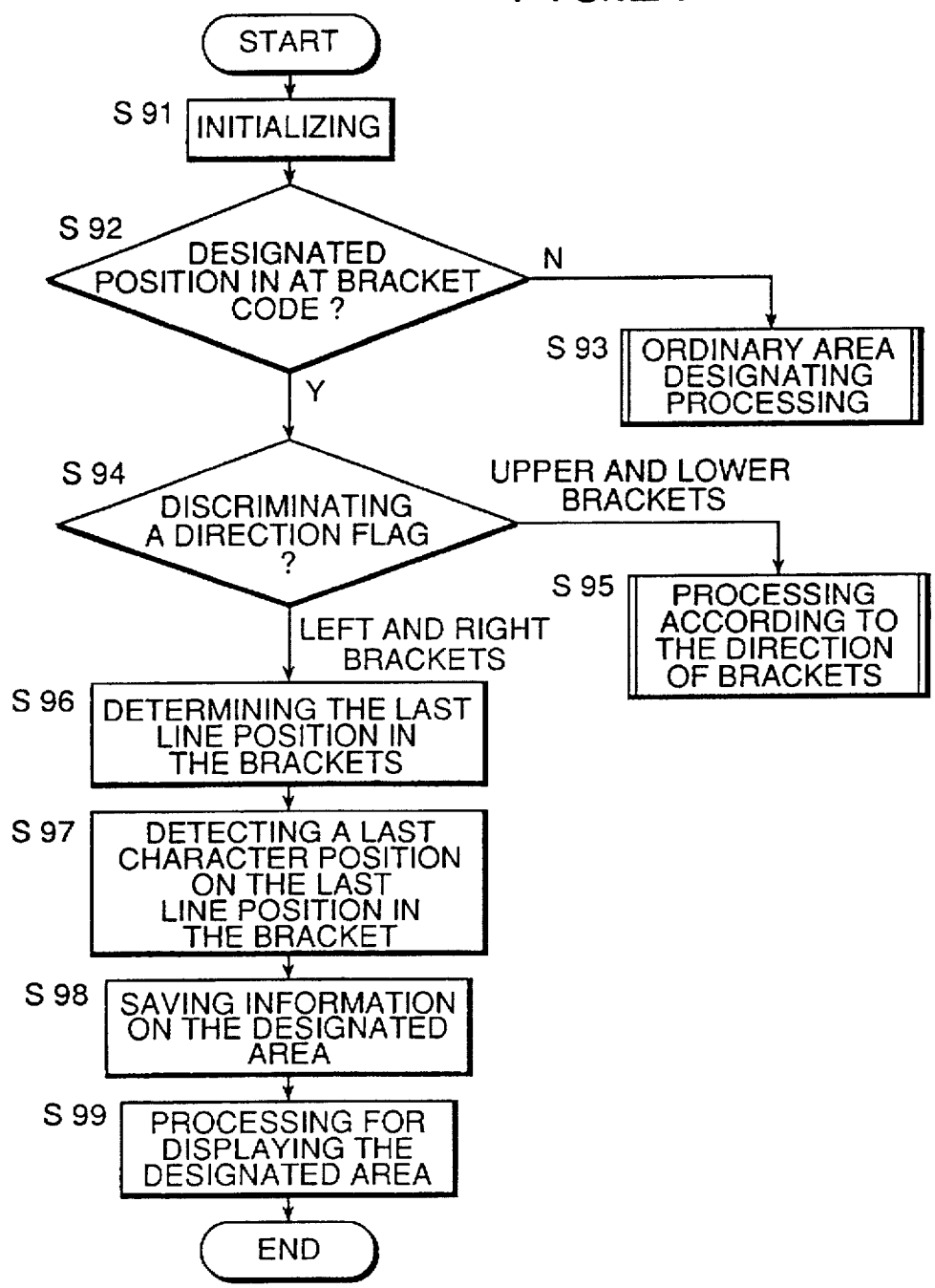
FIG. 21 is a flow chart representing a sequence of operations to specify an area for a plurality of character lines grouped by an extending bracket by a preferred embodiment of the present invention.

FIG. 21 is a processing flow chart of designating an area of lines grouped by an extending bracket according to the present invention.

Step S91 designates a top line in the document data as a current line and the top character in the current line as a current character (by setting a current character pointer indicating an address of the top character in the document buffer 23 in the RAM) and proceeds to Step S92.

Step S92 examines whether the current character pointer indicates an extending bracket or not. The processing proceeds to Step S94 when the pointer indicates the extending bracket. If not, ordinary area designation will be conducted at Step S93 (explanation on this processing is omitted).

Step S94 detects a direction flag 77 from an extending bracket control-code and proceeds to Step S96 when the direction flag indicates a right or left bracket. If not, the ordinary area designation will be made at Step S95.

Step S96 detects a vertical size in the extending bracket control information, updates the current character pointer by the detected vertical length and proceeds to Step S97.

Step S97 detects the current character pointer at the last position on the current line and proceeds to Step S98.

Step S98 saves the designated area information.

At Step S99, a part of a designated area, which is in the editing area, is transferred to the VRAM 14 wherein said part is displayed for example in inverted black-and-white color in case of distinctly displaying the data on the display screen. The procedure is finished.

All steps of FIGS. 16 to 21 are automatically performed by the CPU 11.

A document information processing device according to the present invention offers such advantages that it is capable of easily dividing a symbol or graphic symbol extending over a plurality of horizontal or vertical character lines by judging that the symbol indicated by a cursor is, for example, a bracket grouping a plurality of horizontal or vertical character lines, updating symbol position, symbol type, vertical or horizontal length of the existing bracket to data of brackets to be formed and automatically inserting symbol information in the designated position.

A document information processing device according to the present invention offers such advantages that it is capable of easily synthesizing a symbol or graphic symbol by automatically retrieving two brackets to be synthesized into one bracket in the same vertical or horizontal line as the synthesizing position indicated by a cursor, determining the symbol type, top position of lines, vertical or horizontal length, changing the preceding bracket data to data of a synthesized symbol and deleting the proceeding symbol information.

A document information processing device according to the present invention offers such an advantage that it is capable of realizing easy text editing by widening a symbol such as a bracket or graphic symbol extending over a plurality of horizontal or vertical character lines and, at the same time, automatically entering a single-line or half-line-feed code into each interlinear spacing or entering a blank character between characters or evenly widening line or character spacing by evenly allocating function.

A document information processing device according to the present invention offers such an advantage that it is capable of easily editing a document by automatically unifying a format of an area covered by a symbol in case of inserting, synthesizing and elongating the symbol or graphic symbol which relates to a plurality of horizontal or vertical character lines and extends over a boundary between two differently formatted areas.

A document information processing device according to the present invention offers such an advantage that it is capable of recognizing a specified area to be enclosed in brackets or graphic symbols grouping a plurality of horizontal or vertical character lines when only one point of the symbol is indicated by a cursor, thereby making it easier to designate an area enclosed in the symbols.

A document information processing device according to the present invention offers such an advantage that it is capable of recognizing an area of specified lines to be grouped by a bracket or graphic symbol grouping a plurality of horizontal or vertical character lines when only one point of the symbol is indicated by a cursor, thereby making it easier to designate an area of specified lines therein.

I claim:

1. A text document information processing device comprising:

an input means for inputting text and symbolic characters, where the symbolic characters include a bracket extending over a plurality of horizontal or vertical lines to designated lines of bracketed text presented on a display;

a storage means for storing the text and the symbolic characters, including the bracket and bracketed text;

an input position indicating means for indicating on the display an inputting position in relation to the bracket and the text and symbolic characters;

an editing means for editing the bracket by dividing the bracket into two bracket symbols at a position on the bracket displayed on the screen that is indicated by the input position indicating means; and an output means, including the display, for storing the two bracket symbols, characters and the bracketed text means in the storage means and laying-out and outputting the two bracket symbols and bracketed text to the display, where the two bracket symbols each extend over a plurality of horizontal or vertical lines of a sub-set the bracketed text.

2. A document information processing device as defined in claim 1, further comprising a symbol length discriminating means for judging whether the position indicated by the input position indicating means indicates the bracket symbol to be divided into two bracket symbols when dividing the bracket symbol.

3. A text document information processing device comprising:

an input means for inputting text and symbolic characters extending over a plurality of horizontal or vertical lines of a display;

a storage means for storing the text and the symbolic characters;

an input position indicating means for indicating on the display an inputting position in the text and symbolic characters;

an editing means for synthesizing an extended bracket symbol from a smaller bracket inputted by the input position indicating means on a horizontal or vertical line corresponding to one end of a group of lines of text to be bracketed, and from a bracket code position symbol inputted by the input position indicating means on a line corresponding to another end of the group of lines of text to be bracketed.

4. A text document information processing device as in claim 3, further comprising an information retrieval means for retrieving two synthesizable bracket symbols in a horizontal or vertical direction on a horizontal or vertical line from a position indicated thereon by the input position indicating means.

5. A text document information processing device comprising:

an input means for inputting text and symbolic characters extending over a plurality of horizontal or vertical lines of a display, where the symbolic characters include a bracket associated with bracketed text characters on two or more lines;

a storage means for storing the text and the symbolic characters;

an input position indicating means for indicating on the display an inputting position in the text and symbolic characters;

an editing means for enlarging a spacing between the two or more lines of the bracketed text characters presented on the display, where the bracketed text characters are included within an area defined by the horizontal or vertical length of the bracket as enlarged by the input position indicating portion; and an output means, including the display, for storing the bracketed text and bracket edited by the editing means in the storage means, layout-out and outputting the stored information to the display.

6. A document information processing device as in claim 5, wherein the bracket is edited to have a single unified format.

7. A text document information processing device comprising:

an input means for inputting text and symbolic characters extending over a plurality of horizontal or vertical lines of a display, where the symbolic characters include a pair of brackets adjacent to and associated with bracketed text characters on two or more lines;

a storage means for storing the text and the symbolic characters, and the pair of brackets and bracketed text characters;

an input position indicating means for indicating on the display an inputting position in the text and symbolic characters;

an editing means for editing the pair of brackets together with the bracketed text by recognizing an area enclosed between the pair of brackets as the bracketed text, when the input position indicating means points to a specified bracket code on one of the pair of brackets.

8. A text document information processing device comprising:

an input means for inputting text and symbolic characters extending over a plurality of horizontal or vertical lines of a display, where the symbolic characters include a bracket and the bracket is included in two or more lines of at least text characters on either side of the bracket;

a storage means for storing the text and the symbolic characters;

an input position indicating means for indicating on the display an inputting position in the text and symbolic characters; and an editing means for editing the brackets together with the two or more lines of at least text characters by recognizing and selecting a bracket code associated with the bracket, where the code is indicated by the input position indicating means, and the selection of the bracket code causes the two or more lines of at least text characters to be moved with the bracket as indicated by the input position indicating means.

9. A character editor processing system adapted to manipulate text and symbols as characters on lines of a display, where the system comprises:

the display for presenting the text and symbol characters on lines of a screen, wherein a bracketed character group of two or more lines of characters are designated by and associated with a selected bracket;

an input device for entering the text and symbol characters to be presented on the display, where the input device enables a user to select from the plurality of bracket symbols to enter the selected bracket and to designate the character group associated with the selected bracket, and to designate a location of the selected bracket at which to divide the selected bracket into two brackets;

a memory unit including data files representing the text and symbol characters, and position data specifying screen locations for the text and symbol characters, and where the memory unit stores data correlating lines of text included by the selected bracket;

a processor accessing the memory unit, receiving inputs from the input device, and generating the text and symbol characters to be displayed at their respective screen locations, where the processor executes an editor program that divides the selected bracket into the two brackets in accordance with the designated location, and automatically divides the bracketed character group in accordance with the division of the selected bracket into two brackets.

10. A character editor processing system adapted to manipulate text and symbols as characters on lines of a display, where the system comprises:

the display for presenting the text and symbol characters on lines of a screen, wherein a character group of two or more lines of characters are designated by and associated with a selected small bracket and a bracket code, wherein the small bracket does not span the lines of the character group;

an input device for entering the text and symbol characters to be presented on the display, where the input device enables a user to select from the plurality of bracket symbols to enter the selected small bracket and to insert the selected small bracket at one end of the character group, and enables the user to insert the bracket code at another end of the character group;

a memory unit including data files representing the text and symbol characters, and position data specifying screen locations for the text and symbol characters, and where the memory unit stores data correlating the character group to the selected small bracket and character code;

a processor accessing the memory unit, receiving inputs from the input device, and generating the text and symbol characters to be displayed at their respective screen locations, where the processor executes an editor program that automatically generates a bracket spanning the character group in accordance with the selected small bracket and the character code.

* * * * *